United States Patent
Bouvet et al.

(10) Patent No.: US 11,540,209 B2
(45) Date of Patent: Dec. 27, 2022

(54) METHOD FOR DETERMINING A SET OF ENCODING FORMATS IN ORDER TO ESTABLISH A COMMUNICATION

(71) Applicant: Orange, Paris (FR)

(72) Inventors: Bertrand Bouvet, Perros Guirec (FR); Stéphane Boizard, Fronton (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 16/311,628

(22) PCT Filed: Jun. 12, 2017

(86) PCT No.: PCT/FR2017/051493
§ 371 (c)(1),
(2) Date: Dec. 19, 2018

(87) PCT Pub. No.: WO2017/220883
PCT Pub. Date: Dec. 28, 2017

(65) Prior Publication Data
US 2019/0327666 A1 Oct. 24, 2019

(30) Foreign Application Priority Data
Jun. 20, 2016 (FR) ...................... 1655701

(51) Int. Cl.
*H04W 48/16* (2009.01)
*H04L 1/00* (2006.01)
(Continued)

(52) U.S. Cl.
CPC ........... *H04W 48/16* (2013.01); *H04L 1/0009* (2013.01); *H04L 5/0053* (2013.01); *H04W 76/10* (2018.02)

(58) Field of Classification Search
None
See application file for complete search history.

(56) References Cited

U.S. PATENT DOCUMENTS 9,674,242 B1 * 6/2017 Fritz ................... H04L 65/1006
2002/0142749 A1 * 10/2002 Muniere ............... H04W 28/18
455/403

(Continued)

FOREIGN PATENT DOCUMENTS

WO WO-2014166366 A1 * 10/2014 ............. H04L 65/00

OTHER PUBLICATIONS

International Search Report and Written Opinion dated Sep. 8, 2017 for Application No. PCT/FR2017/051493.

*Primary Examiner* — Jay L Vogel
(74) *Attorney, Agent, or Firm* — Knobbe, Martens, Olson & Bear, LLP

(57) ABSTRACT

A method is described for determining a set of coding formats usable by a first terminal to establish communications with a second terminal. The method includes obtaining, from a server, a first set of coding formats permitted on the communication network, and associated with a type of access network and with a type of communication service, and obtaining a second set of coding formats supported by the terminal, a type of access network, and a type of communication service which are used by the terminal. A third set of coding formats are determined, corresponding to a set of coding formats supported by the terminal and permitted by the network with regard to the type of network access and to the type of communication service used by the terminal, and a setup message is transmitted to the second terminal including at least one coding format included in the third set when the third set is not empty.

20 Claims, 3 Drawing Sheets

Figure 1:
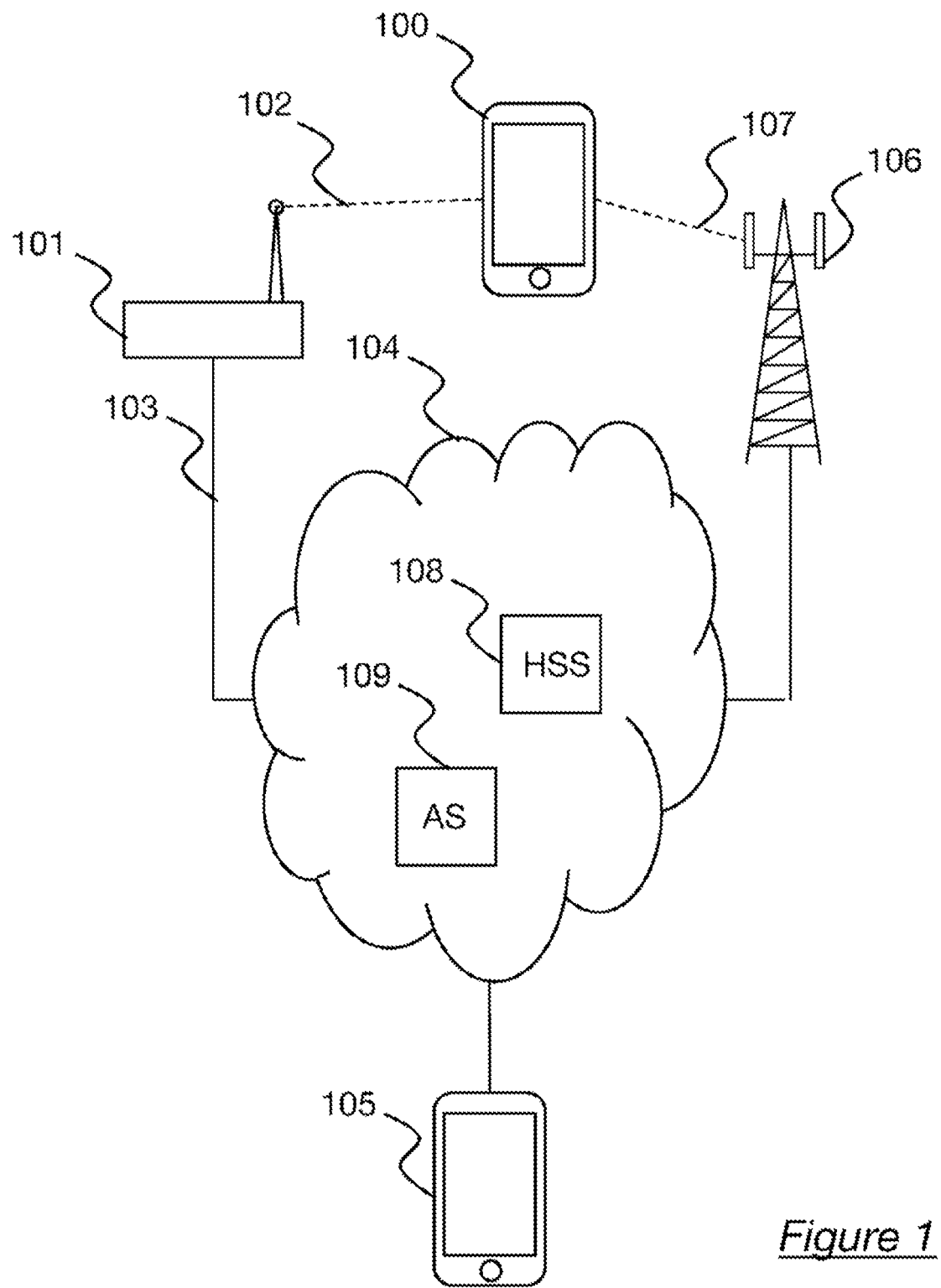

(51) Int. Cl.
*H04L 5/00* (2006.01)
*H04W 76/10* (2018.01)
*H04L 9/40* (2022.01)

(56) References Cited

U.S. PATENT DOCUMENTS

| | | | |
|---|---|---|---|
| 2007/0171841 A1* | 7/2007 | Witzel | H04L 29/06027 370/254 |
| 2007/0183493 A1* | 8/2007 | Kimpe | H04N 19/154 375/240.1 |
| 2008/0027953 A1* | 1/2008 | Morita | H04N 21/4363 |
| 2008/0083004 A1* | 4/2008 | Kim | H04L 29/06027 725/114 |
| 2009/0003570 A1 | 1/2009 | Sindhwani et al. | |
| 2010/0085959 A1* | 4/2010 | Vohra | H04L 65/1009 709/228 |
| 2010/0093284 A1* | 4/2010 | Terrero Diaz-Chiron | H04L 67/22 455/67.11 |
| 2011/0136483 A1* | 6/2011 | Dwight | H04W 28/18 455/422.1 |
| 2012/0294280 A1* | 11/2012 | Bienn | H04W 36/0022 370/331 |
| 2014/0328323 A1* | 11/2014 | Zhang | H04L 69/24 370/331 |
| 2014/0362764 A1* | 12/2014 | Aksu | H04L 65/80 370/328 |
| 2015/0046514 A1* | 2/2015 | Madan | H04L 67/10 709/203 |
| 2016/0021163 A1* | 1/2016 | Lee | H04L 65/103 370/352 |
| 2016/0072868 A1* | 3/2016 | Poulin | H04L 65/605 709/219 |
| 2016/0119399 A1* | 4/2016 | Glass | G06F 9/45529 709/219 |
| 2016/0302060 A1* | 10/2016 | Agardh | H04L 67/16 |
| 2016/0316243 A1* | 10/2016 | Park | H04N 21/25858 |
| 2016/0352801 A1* | 12/2016 | Krishna | H04L 43/16 |
| 2017/0117985 A1* | 4/2017 | Bruhn | H04W 76/10 |

\* cited by examiner

METHOD FOR DETERMINING A SET OF ENCODING FORMATS IN ORDER TO ESTABLISH A COMMUNICATION

TECHNICAL FIELD

The patent application lies in the field of telecommunications and more particularly in the services of mobile or fixed networks implementing a technology of IMS (Internet Multimedia subsystem) type.

PRIOR ART

The new telecommunications networks such as for example the networks of IMS (Internet Multimedia Subsystem) type offer diversified multimedia services such as voice, video or instant messaging. In order to adapt to various constraints, these services implement various codecs and protocols for each of the communication modalities. For example, an audio communication on an IMS network can implement a G.711, G.722, AMR or else AMR-WB codec. The coding format actually used during communication results from a negotiation between the terminals and other network equipment involved in the communication. Thus, for each of the communication modalities that they support, the terminals have at their disposal a plurality of codecs allowing them to adapt to a maximum of situations. These codecs are also implemented in media network equipment (e.g.: IMS-AGW, MGW, MRF, A/I-SBC, Voice mail, voice portal, legal intercepts, etc. . . . ) or network terminations such as residential gateways.

When a terminal registers on a telecommunication network, such as an IMS network, it provides various items of information, such as for example its public and private identities, a contact address, and the services that it supports. However, during its registration on the network, a terminal does not indicate the codecs that it supports. Thus, a terminal can register with a telecommunications service even if it does not have at its disposal any codec supported by the intermediate equipment and the terminals of the network.

When a terminal which does not have any compatible codecs at its disposal is registered with a telecommunications service, it needlessly consumes resources both in the network core and in the access network. These may be critical resources, such as for example an LTE (Long Term Evolution) radio access resource used to exchange messages of renewal of the registration or of subscriptions to various services.

A terminal which registers with a VoIP (voice Over IP) service without having compatible codecs at its disposal also poses problems at the level of the ergonomics of the telecommunication service. Indeed, a terminal regularly registered on the network appears to be reachable, but will not be able to establish any communication. In case of incoming call, the network will in certain cases be able to implement a fallback solution, such as for example establish a circuit communication to the same terminal. This brings about a lengthening of the setup time for establishing the communication or else this could cause a systematic call return to its messaging facility.

It is also observed that today's terminals make it possible to use a communication service independently of the access network. For example, the IMS technology allows terminals to connect to the service by way of a Wi-Fi access network (VoWiFi for Voice Over Wi-Fi) or by way of a cellular access network (VoLTE for Voice Over Long Term Evolution). The codecs available on a terminal are the same whatever the access technology. Nevertheless, a telecom operator may wish to prioritize or prohibit the use of certain codecs depending on the access technology.

Telecom operators sometimes carry out maintenance operations on certain equipment or segments of the network. Such maintenance operations may influence, in a more or less lasting way, the bandwidth available in certain parts of the network. No mechanism exists which allows an operator to dynamically limit the use of certain codecs in these particular circumstances. The configuring of filtering rules on certain nodes of the network is not a satisfactory solution, since such filtering would apply to a large number of terminals, including to those which are not concerned in the maintenance operation, on account of the centralization of the equipment in the IMS architecture and of dynamic mechanisms for load sharing on the various items of equipment, for example via DNS (Domain Name Server) resolution.

Finally, it may be noted that today's terminals support numerous codecs. When establishing a communication, this list of codecs is exchanged with other terminals and network equipment. The size of the signaling messages may thus be such that it causes a fragmentation of the signaling messages. This fragmentation induces a multiplication of the IP (internet Protocol) packets, thereby bringing about a decline in performance of the equipment and increased consumption of bandwidth.

A need therefore exists for a solution allowing operators to control, at the moment of its registration, the codecs usable by a terminal.

SUMMARY OF THE INVENTION

For this purpose, the invention relates to a method for determining a set of coding formats usable by a first terminal to establish communications with a second terminal through a communication network, the first terminal being connected to a communication network by way of an access network.

The method is noteworthy in that it comprises the following steps:
  Obtaining, from a server, a first set of coding formats permitted on the communication network, each format of the set being associated with a type of access network and with a type of communication service,
  Obtaining a second set of coding formats supported by the terminal, a type of access network, and a type of communication service which are used by the terminal,
  Determining a third set of coding formats, the third set corresponding to a set of coding formats supported by the terminal and permitted by the network having regard to the type of network access and to the type of communication service used by the terminal, and
  Transmitting to the second terminal a setup message for establishing a communication comprising at least one coding format included in the third set when the third set is not empty.

The term "coding format" refers here to a data item making it possible to identify a digital signal compression and/or decompression standard. Such a compression and/or decompression device is commonly called a "codec", for coder-decoder. For example, the G.711 standard defines an audio coding format, and h.264 defines a video coding format.

By access network is meant a network allowing a terminal to access a communication network. This may entail for example a Wi-Fi network, a cellular network, an Ethernet network or any other type of network allowing a terminal to connect to a communication network. A type of access network corresponds here to a data item making it possible to identify the type of a particular access network.

The terms "communication service" correspond in this description to services which the terminal can access by virtue of the capabilities afforded by the communication network or the options subscribed to by the user with an operator of the network. This may entail for example communication modalities such as the possibility of establishing, or not, video, audio or else of instant messaging communications.

Here, a terminal can be any type of communication equipment, such as for example a mobile terminal of Smartphone or tablet type, a mobile telephone, a conference bridge or else any connected object.

Such a determining method proposes to restrict the codecs usable by a terminal as a function of the capabilities of the network, of the network access and of the communications services used by the terminal at a given instant. The capabilities of the network corresponding to coding formats permitted for an access network and/or a given communication service. For example, a network operator may decide not to permit certain coding formats on the basis of the accesses on which the bandwidth is rare and expensive. The operator may also decide to permit or to prohibit the use of certain coding formats for certain types of services or of commercial offerings.

Thus, the invention proposes to obtain, from a server, a first set of codecs permitted by type of network access and by type of communication service, to compare this first set with the set of the codecs supported by the terminal, and to deduce therefrom a third set containing only the codecs supported by the terminal, and permitted by the network in the terminal's conditions of access to the network and to the service. The first set consists of one or more lists of codecs. Each of the codecs of the first set is associated with a type of access network within the framework of which its use is permitted or prohibited. Each of the codecs is also associated, explicitly or implicitly, with a type of service within the framework of which the use of the codec is permitted or prohibited. In a particular embodiment, each codec is associated with a priority of use.

In this way, the method allows the determination of a set of coding formats usable by a terminal to establish, via a communication network, communications according to particular modalities and on the basis of a particular access network.

According to a particular embodiment, the method is such that it furthermore comprises a step of unregistering the first terminal when none of the coding formats supported by the terminal is included in the first set, or when the third set is empty.

In this way, when the terminal does not support any coding format permitted by the network, the terminal is unregistered from the communication service. Thus, the terminal devoid of communication capabilities does not needlessly use resources as is the case with the current technique.

According to a particular realization, the method is such that at least one coding format of the first set is furthermore associated with an identifier of a network access point.

Such a provision allows an operator of the network to prohibit the use of a particular coding format when a terminal accesses the network from a particular access point. In this way, when the capabilities of the access point are reduced during a maintenance operation for example, an operator can ensure that only the most economical coding formats in terms of bandwidth will be used.

According to a particular realization, the method is such that:
the method is implemented in a terminal,
the first set of formats is obtained on the basis of a message originating from a server The method can thus be implemented by a terminal. To this end, the terminal may for example subscribe to events relating to the codecs supported by the telecommunication network, so as to regularly receive a message containing a set of coding formats permitted by the network. The terminal may also obtain the first set from a response message in reply to a capabilities discovery request, such as for example an SIP OPTIONS request. The terminal can thus determine the coding formats that it can use on the network, on the basis of the first set received and of the second set obtained on the basis of its own communication capabilities, of the type of access network to which it is connected and of the type of service which it wishes to access. From the third set, the terminal generates a communication setup message comprising the coding formats determined. For example, the terminal generates an SDP (Session Description Protocol) session description of these capabilities on the basis of the formats determined in the third set and inserts this description into a signaling message of SIP INVITE, SIP UPDATE, SIP ACK, SIP 183 In Progress or else SIP 200OK type. By preventing the signaling messages of calls arising from the terminal from comprising codecs which are not supported or permitted by the network, the invention makes it possible to reduce the traffic by decreasing the sizes of the data exchanged, to reduce the time for processing the requests by the communication servers by a reduction in the volume of data to be processed and to reduce the risk of fragmentation of the IP packets.

According to a particular realization, the method is such that it furthermore comprises, a step of downloading an executable module for the encoding and the decoding of a component of a communication when the third set of encoding formats is empty.

When at least one coding format permitted by the network is not supported by the terminal, the latter can download an executable module comprising the instructions for encoding and/or decoding data according to this coding format. Thus, a terminal which does not have at its disposal capabilities allowing it to establish communications on the network can obtain from a server an executable module allowing it to establish communications according to at least one permitted coding format.

According to a particular embodiment, the method is such that:
the method is implemented in a server,
the second set of formats is obtained from a message originating from the first terminal.

The invention can be implemented by a server, such as a communication network application server (AS). The application server obtains the second set of coding formats relating to the capabilities of the terminal from a message originating from this terminal. Such a message may be a communication setup message such as for example an SIP INVITE message or an SIP 200OK, SIP 183 response, or else an SIP UPDATE or SIP ACK message. The second set of formats can also be obtained from a capabilities discovery message, such as for example an SIP OPTIONS request or a response to such a request. For example, the server can intercept a call setup message and extract therefrom the type of access network used by the terminal, the communication service desired by the terminal as well as the codecs supported by the terminal so as to constitute the second set. On the basis of the first and second sets obtained, the application server can determine a third set of codecs permitted for communication on the network. The call setup message is modified in such a way as to replace the codecs declared by the terminal with the codecs of the third set, which are compatible with the capabilities of the terminal and those of the network in the terminal's access and service conditions.

According to a particular embodiment, the method is such that the first set of coding formats is obtained on the basis of a notification message originating from a server of user profiles of the communication network.

The first set of formats can be obtained by a notification message originating from a server of user profiles such as an HSS (Home Subscriber Server) or an SDM (Subscriber Data Management) in the case of an IMS network. Such a server centralizes the information relating to the users. Thus, the invention proposes to add into the client profiles present in such a server, the codecs permitted for each type of access (2G, 3G, 4G, 5G, Wi-Fi, . . . ) and for each communication service (voice, video, . . . ).

It may be noted that the mobile terminals are located by the mobile telecommunication network upon each change of radio cell group. This location information is stored in real time in the HSS/SDM. Thus, the method makes it possible to implement restrictions of use of coding formats depending on the access point used by the terminal.

According to another aspect, the invention relates to a device for determining a set of encoding formats usable by a first terminal to establish communications with a second terminal through a communication network, the first terminal being connected to a communication network by way of an access network, the device being characterized in that it comprises:
- a communication module adapted to receive a first set of coding formats permitted on the communication network, each format of the set being associated with a type of access network and with a type of communication service,
- a module for obtaining a second set of coding formats supported by the terminal, a type of access network, and a type of communication service which are used by the terminal,
- a module for determining a third set of coding formats, the third set corresponding to a set of coding formats supported by the terminal and permitted by the network having regard to the type of network access and to the type of communication service used by the terminal.

According to yet another aspect, the invention pertains to a communication terminal comprising a determining device such as described hereinabove.

The invention also relates, according to another aspect, to a server such that it comprises a determining device such as described hereinabove.

The invention also relates to a computer program comprising the instructions for the execution of the determining method such as described hereinabove, when the program is executed by a processor.

Finally, the invention pertains to an information medium readable by a processor on which is recorded a computer program comprising instructions for the execution of the steps of the determining method such as described hereinabove.

The information medium may be any entity or device capable of storing the program. For example, the medium can comprise a storage means, such as a ROM, for example a CD ROM or a microelectronic circuit ROM, or else a magnetic recording means, for example a diskette (floppy disk) or a hard disk. Moreover, the information medium can be a transmissible medium such as an electrical or optical signal, which can be conveyed via an electrical or optical cable, by radio or by other means. The program according to the invention can be in particular downloaded over a network of Internet type. Alternatively, the information medium can be an integrated circuit in which the program is incorporated, the circuit being adapted to execute or to be used in the execution of the method in question.

The various aforementioned modes or characteristics of embodiment can be added independently or in combination with one another, to the steps of the method such as defined hereinabove.

The terminals, servers, devices, programs and information media exhibit at least advantages analogous to those conferred by the method to which they pertain and described hereinabove.

LIST OF FIGURES

Figure 2:
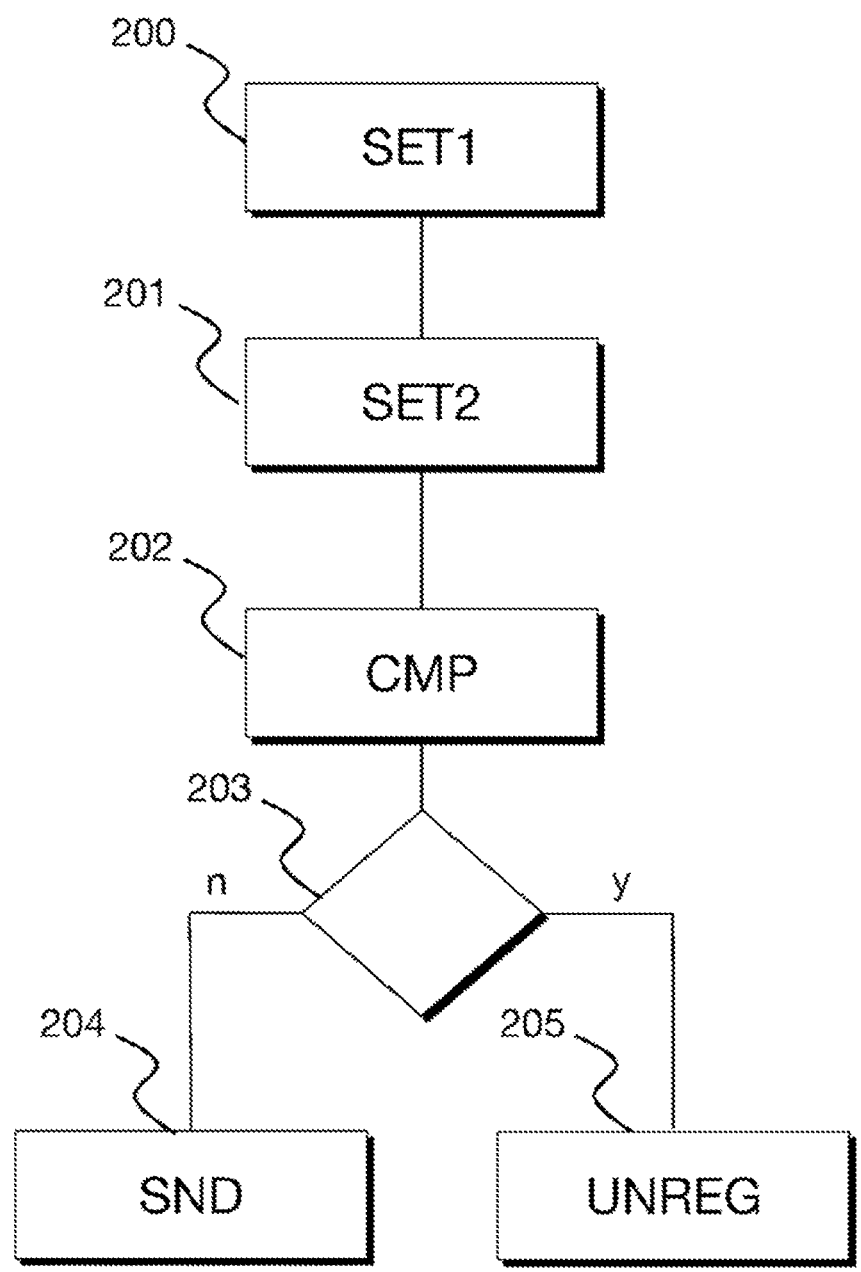
Figure 3:
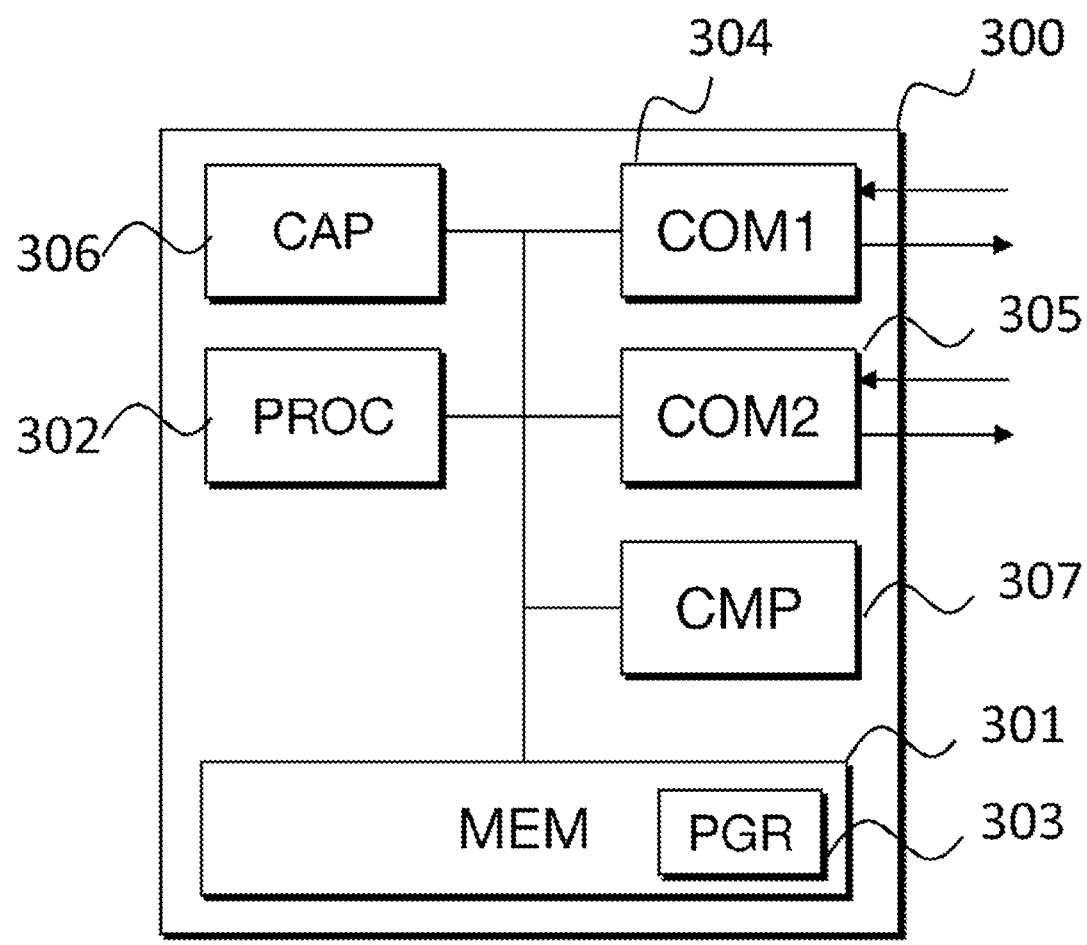

Other characteristics and advantages will become apparent on reading preferred embodiments described with reference to the figures among which:

FIG. 1 illustrates an architecture adapted to implement the determining method according to a particular embodiment of the invention, FIG. 2 illustrates the main steps of the determining method according to a particular embodiment of the invention, and FIG. 3 represents the architecture of a device adapted for the implementation of the determining method according to a particular realization of the invention.

DETAILED DESCRIPTION

FIG. 1 illustrates an architecture adapted to implement the selection method according to a particular embodiment of the invention.

FIG. 1 represents a terminal 100 connected to an access point 101 by way of a wireless link 102. The terminal 100 is a communication terminal of Smartphone type having at its disposal at least two network interfaces allowing it to connect to a communication network 104 in various ways.

A first network interface of the terminal 100 is for example a Wi-Fi network interface adapted to connect the terminal to the access point 101. Such an access point is for example an ADSL router modem offering a wireless communication interface 102 of Wi-Fi type. The access point 101 also comprises a second communication interface 103, for example an interface of ADSL (Asymmetric Digital Subscriber Line) type to a communication network 104. The network 104 is for example a network of IMS (Internet Multimedia Subsystem) type. The terminal 100 can thus establish a communication with a second terminal 105 by way of the Wi-Fi connection 102, of the modem-router 101, of the ADSL network 103 and of the communications network 104.

The terminal 100 also has at its disposal a second network interface. This interface is adapted to connect the terminal to the communication network 104 by way of a second access network 106. The access network 106 is for example a cellular network of 2G, 3G or 4G type. The terminal 100 can thus establish a communication with the terminal 105 through a connection 107 to the cellular network 106 and through the communication network 104.

Thus, the terminal can establish communications with the terminal 105 by means of one or the other of the network interfaces which it has at its disposal.

The IMS network furthermore comprises a server of user profiles 108 which may correspond for example to an HSS (Home Subscriber Server) server and an application server (Application Server) 109. An HSS server such as the server 108 comprises a database containing the list of users and their associated rights and permissions, as well as the state of the registrations and the call sessions in progress. Such a server can provide user location information and communicates with other entities of the IMS core network by way of the "Diameter" protocol. In particular, the server 108 can communicate with the application server 109 to notify it of the modifications of the database. The application server 109 hosts and executes communication services and interfaces with other equipment of the network by way of the SIP protocol. In particular, the server 109 can intercept the signaling messages exchanged between the terminal 100 and the terminal 105.

Although the present description is given with reference to a communication network of IMS type, the invention is in no way limited to this type of network and is appropriate for various types of communication networks and/or protocols.

FIG. 2 illustrates the main steps of the determining method according to a particular embodiment of the invention.

In a first particular embodiment, the determining method is implemented in a terminal such as the terminal 100 of FIG. 1.

During a first step 200, the terminal 100 obtains a first set of coding formats permitted on the communication network 104.

The terminal obtains this first set from a notification message originating from the server 109. The notification is received subsequent to a subscription to an appropriate event type. For example, the terminal 100 can transmit an SIP SUBSCRIBE request to the server 109 so as to receive notifications relating to a change in the restrictions of use of codecs on the network. The first set is then received in an SIP NOTIFY message sent by the server 109. The permitted coding formats are indicated in the body of the notification message in an appropriate data structure, for example in a document in accordance with the XML format. The application server 109 can itself obtain the set of permitted coding formats from the HSS server 108 by way of the Diameter protocol.

Such a notification may be received at regular intervals, or else solely at the moment of the subscription and of the later modifications of the coding formats permitted on the network.

In the data structure obtained, one or more coding formats are associated in an explicit or implicit manner with an access network type. The access network type information may correspond to the RAT (Radio Access Technology) or to any other identifier making it possible to identify the type of an access network. Such an identifier makes it possible in particular to distinguish the various access network technologies (2G, 3G, 4G, 5G, Wi-Fi, etc. . . . ). Thus, the received set of coding formats allows the terminal 100 to determine the codecs that it can use to establish communications on the access network 102, and the coding formats that it can use when it connects by way of the cellular network 107.

In the data structure obtained, one or more coding formats can furthermore be associated with a type of communication service, such an association being able to be explicit or implicit. When the type of communication service corresponds to media usable during a communication, this association can be implicit. For example, an AMR coding format is associated implicitly with a communication service of audio type, whilst a coding format of H.264 type is associated implicitly with a video communication service. When the type of communication service refers to a commercial offering relating for example to a maximum bitrate or a quality of service allocated by the operator to the terminal 100, the association may be explicit.

Thus, the terminal 100 knows the coding formats permitted according to the type of access network and the communication service that it expects to use for a communication.

The coding formats may also be associated with an identifier of the access point. In this way, a network operator can impose restrictions on the use of certain codecs for the communications established by way of a particular access point. Such a provision may turn out to be particularly useful during certain maintenance operations on an item of equipment serving the access point, in order to reduce the traffic. Such an identifier can also be an indication relating to a geographical area and correspond to a plurality of access points. It is thus possible for an operator to impose restrictions during past communications on the basis of sites grouping together a large number of users, such as for example sports equipment, shared public transports or else on the basis of regions that have suffered natural disasters.

In step 201, the terminal obtains a second set of coding formats. This second set corresponds to the capabilities of the terminal, that is to say to the codecs that it supports for the communications. The terminal may for example know its own capabilities by way of an API (Application Programming Interface) of the operating system. The terminal also obtains the type of access network to which it is attached. This item of information is generally available by way of an API, provided for this purpose, of the operating system. Finally, the terminal obtains an item of information relating to the type of communication service that it expects to use or may use to establish a communication. This item of information, when it pertains to a type of medium (audio, video, text, . . . ) may stem implicitly from the capabilities of the terminal, but may also depend on the type of communication that a user wishes to pass or accept. In this case, the type of service is known at the moment at which the user places or accepts a call. When the type of communication service pertains to a commercial offering subscribed to by the user of the terminal 100, this item of information may be obtained from a memory of the terminal, into which a profile of the user is downloaded during registration on the communication network 104. Such an item of information can also be obtained from a SIM card of the terminal or a configuration of the terminal by the operator. According to a particular realization, the terminal obtains a data item in respect of geographical location from a GPS (Global Positioning System) location component of the terminal or from an identifier of access point to which it is attached.

During a step 202, the terminal determines a third set of coding formats. This third set corresponds to the intersection of the first set of formats transmitted by the server 109 with the second set of formats corresponding to the capabilities of the terminal, while taking account of the type of access network and of the type of communication service used by the terminal, and if relevant of the terminal's geographical location, determined by way of an identifier of the access point. To carry out this intersection, the terminal searches the second set of the coding formats which are associated with the type of access network that it uses and with the communication service determined. The terminal thus obtains the various codecs permitted by the network in its situation. The terminal thereafter compares this usable list of codecs with its own capabilities so as to establish a list of the codecs that it supports and which are permitted on the network.

In step 203, the terminal examines the third set so as to determine whether it comprises at least one coding format which is both supported by the terminal and permitted by the network as a function of the access network, of the service requested and if relevant of the geographical location of the terminal.

If the third set is empty, the terminal 100 will not be able to establish any communication on the network 104. In this case, the terminal transmits in step 205 an unregistration request destined for the communication network 104. Such a provision is aimed at releasing the resources occupied in the network on account of the registration of the terminal. A registered terminal actually generates regular traffic to renew its registration and occupies resources in the memory of the network equipment. Unregistration can be carried out in a conventional manner, by dispatching an SIP REGISTER request indicating a zero duration of registration via a header "expires=0". The fact of no longer being registered does not disturb the reception of the notifications relating to the coding formats supported by the network. Thus, according to a particular realization of the invention, the terminal will be able to send a registration request if after reception of a notification relating to a modification of the codecs permitted by the network, it notes that a coding format that it supports has become usable in the terminal's service and network access conditions.

According to a particular realization, when the third set is empty, the method furthermore comprises a step of downloading, from a server, an executable module comprising instructions for implementing a coding format permitted by the network. In this way, the terminal 100 can always establish a communication with the terminal 105. Downloading can be performed in a conventional manner from a download server, such as for example an http server, whose URL (Universal Resource Locator) may have been provided to the terminal during a prior configuration step.

If conversely the third set determined by the terminal is not empty, that is to say if it contains at least one coding format usable by the terminal, the terminal transmits during a step 204, destined for the terminal 105, a setup message for establishing a communication comprising at least one coding format included in the third set. In the case of an outgoing communication, the terminal 100 can thus prepare an SIP message of INVITE type configured to establish a communication with the terminal 105. In the body of this message, the terminal 100 inserts a description of these capabilities in accordance with the SDP (Session Description Protocol) standard. The communication capabilities indicated in the SDP description comprise solely one or more coding formats included in the third set of coding formats, determined during step 202.

By proceeding thus, the method according to the invention makes it possible to guarantee that only communications implementing codecs permitted in the terminal's attachment and service conditions, can be established.

According to a particular embodiment of the invention, the determining method is implemented by a server such as for example the server 109 of FIG. 1.

The obtaining step 200 is similar to that described previously, apart from the difference that the format set is obtained from a server of user profiles such as the server 108 of FIG. 1. This entails for example an HSS server configured to communicate with the server 109 by way of a standardized Diameter interface "sh" between the application server 109 and the HSS/SDM and provide in, addition to the services data that it provides in a conventional manner, the codecs permitted as a function of the RAT (Radio Access Technology). This interface can be used in "pull" mode and in "push" mode, that is to say that the server 109 can, during the initial registration of the terminal 100, recover the service profile from the server 108 and then, upon each modification of the profile of the user in the server 108, receive a notification comprising the permitted codecs on the basis of which the server 109 can obtain the first set of formats.

The server 109 obtains in step 201 a second set of coding formats comprising the formats supported by the terminal. The second set is obtained by the server 109 from a message originating from the terminal 100. In a preferential manner, this message is a signaling message intended to establish a communication between the terminal 100 and the terminal 105. For example, it may entail an SIP INVITE message sent to the terminal 105 by the terminal 100 and intercepted by the server 109. The SIP INVITE messages comprise in a conventional manner the capabilities of the sender terminal issuing the message. These capabilities are indicated according to the SDP (Session Description Protocol) standard and comprise the various codecs supported by the terminal.

The signaling message can also be an SIP 200OK response message sent by the terminal 100 subsequent to the reception of an SIP INVITE message sent by the terminal 105.

The server 109 can obtain an item of information relating to the access network used by the terminal from this same message, or else of a registration message intercepted beforehand. For example, the "P-Access-Network-Info" header defined in the IETF document RFC3455 provides for a standardized mechanism allowing a terminal or the entry point of the communication network 104 to communicate the type of access network that it uses in an SIP message. The server 109 can also obtain the type of access network used by the terminal from a notification transmitted by the profile server 108. This may entail the RAT, which an HSS server is aware of subsequent to the registration of the terminal and to the updating of its location when changing LA (Location Area for 2G/3G) or TA (Tracking Area for 4G). When it relates to media components of a communication, the item of information relating to the type of communication service is also available in the SDP SDP description and/or in the service identifiers (ICSI: IMS Communication Service Identifier) and/or SIP header (for example P-Asserted-Service) included in the communication setup SIP message intercepted. When the type of communication service pertains to a commercial offering subscribed to by the user, this item of information can be obtained in the notification transmitted by the server 108 and described previously.

Thus, the server 109 obtains a second set of coding formats supported by the terminal, a type of access network and a type of communication service which are used by the terminal.

The server 109 thereafter determines a third set of coding formats, this third set corresponding to a set of coding formats supported by the terminal and permitted by the network having regard to the type of network access and to the type of communication service used by the terminal. This determination is carried out by the server 109 in accordance with step 202 described previously.

In a similar manner to step 203 described with reference to the previous embodiment, the server 109 examines the third set so as to determine whether it comprises at least one coding format which is both supported by the terminal and permitted by the network as a function of the access network, of the service requested and if relevant of the geographical location of the terminal.

When, subsequent to step 203, the server 109 notes that the third set is empty, that is to say that no communication is possible for the terminal 100, the server 109 cancels the communication setup.

To this end, the server 109 may generate an error message in response to the communication setup message sent by the terminal 100 on the basis of which the second set of formats has been obtained. If this message is a message of SIP INVITE type, the server 109 can respond by a message of type "488—Not acceptable here". This is an error message used in a conventional manner when none of the codecs proposed by a terminal is supported by the remote terminal. If the message is an SIP 200OK message sent by the terminal 100 in response to an invitation to establish a communication sent by the terminal 105, the server 109 can cancel the communication by sending a message of SIP CANCEL type to the terminal 100 and a message "488—not acceptable here" destined for the terminal 105.

When the server notes that the third set is empty, the server 109 can furthermore bring about the unregistration of the terminal. To this end, the server 109 may for example wait for the renewal of the registration of the terminal and refuse at this moment the registration by way of the known "Third Party Registration" mechanism. Such a mechanism allows equipment of an IMS network to forward the request for registration of a terminal to other servers so that the latter give their agreement to the registration. In this instance, a server S-CSCF (Serving—Call/Session Control Functions) handling the terminal 100 can forward the request for registration of the terminal to the application server 109, the latter being able at that moment to refuse the registration of the terminal.

If subsequent to step 203 the server 109 notes on the contrary that at least one codec of the terminal is compatible with the demands of the network, that is to say if it notes that the third set determined comprises at least one usable coding format, the server modifies the intercepted signaling message by deleting from the session description in accordance with the SDP protocol the codecs which do not belong to the third set. The server 109 thereafter transmits the modified message to the recipient terminal 105 to which the message is addressed.

Thus, the method makes it possible to prevent a communication between the terminal 100 and the terminal 105 from being established according to a coding format that is not permitted by the network 104.

FIG. 3 illustrates the architecture of a device adapted for the implementation of the determining method according to a particular realization of the invention.

The device 300 comprises a storage space 301, for example a memory MEM, a processing unit 302 equipped for example with a processor PROC. The processing unit can be driven by a program 303, for example a computer program PGR, implementing the determining method such as described in the invention with reference to FIG. 2, and in particular the steps of obtaining, from a server a first set of coding formats permitted on the communication network, each format of the set being associated with a type of access network and with a type of communication service, of obtaining a second set of coding formats supported by the terminal, a type of access network, and a type of communication service which are used by the terminal, of determining a third set of coding formats, the third set corresponding to a set of coding formats supported by the terminal and permitted by the network having regard to the type of network access and to the type of communication service used by the terminal, and of transmitting to the second terminal a setup message for establishing a communication comprising at least one coding format included in the third set when the third set is not empty.

On initialization, the instructions of the computer program 303 are for example loaded into a RAM (Random Access Memory) memory before being executed by the processor of the processing unit 302. The processor of the processing unit 302 implements the steps of the determining method according to the instructions of the computer program 303.

To this end, the device comprises a communication module 304 adapted to receive a first set of coding formats permitted on the communication network, each format of the set being associated with a type of access network and with a type of communication service. Such a module can be a network interface, for example an interface of Ethernet, Wi-Fi type or any other network interface adapted to receive a notification originating from a server such as the server 109 described previously. According to a particular realization, the module 304 is adapted to receive a format set in a notification transmitted by an application server. According to another particular realization, the module 304 is adapted to receive a format set in a notification transmitted by a server of user profiles such as an HSS.

The device also comprises an obtaining module 306 for obtaining a second set of coding formats supported by the terminal, a type of access network, and a type of communication service which are used by the terminal. According to a particular realization, the module 306 is a software module comprising instructions which are executable by the processor 302 and are configured to obtain the capabilities of the terminal, that is to say to obtain a set of coding formats supported by the terminal. Such instructions can include calls to APIs of an operating system of a terminal in which the device is integrated. The module 306 also comprises instructions including calls to APIs of the operating system making it possible to obtain the type of access network to which the terminal is attached and a type of communication service. The type of communication service can be obtained, when it relates to the media that the user of the terminal wishes to implement in the communication, from the interactions of the user with an interface of the terminal. When the type of communication service pertains to a particular commercial offering, the module 306 can comprise instructions making it possible to interrogate data of the operator which are stored in a memory of the terminal or a SIM card of the terminal.

According to a particular realization, the obtaining module 306 comprises instructions configured to intercept a communication setup message transmitted by the terminal 100, analyze this message so as to extract therefrom a session description in the SDP format and obtain a set of codecs supported by the sender terminal issuing the message. The module is furthermore configured to extract an item of information relating to the type of access network from a header of the signaling message comprising an indication about the type of access network used. The module 306 also comprises instructions for obtaining, from a notification sent by a server of user profiles, a type of communication service associated with the user of the terminal.

The device 300 also comprises a comparator 307, adapted to determine a third set of coding formats, the third set corresponding to a set of coding formats supported by the terminal and permitted by the network having regard to the type of network access and to the type of communication service used by the terminal. Such a comparator can be implemented in a software manner by a computer program executable by the processor 302 and are configured to compare a first set of coding formats with the coding formats obtained by way of the module 306. The comparator 307 is configured to take account of the type of access network to which the terminal is connected and of the type of communication service envisaged to establish a communication.

The device finally comprises a communication module 305 adapted to transmit to a recipient terminal such as the terminal 105, a setup message for establishing a communication comprising at least one coding format included in the third set when the third set is not empty. Such a module can consist of a network interface of Ethernet, 2G, 3G, 4G, 5G, Wi-Fi type or any other interface adapted to exchange messages on a communication network. According to a particular realization according to which the device is integrated into a terminal, the module 305 furthermore comprises computer program instructions executable by the processor 302 and configured to generate a communication setup message, such as for example an SIP INVITE message or an SIP 200OK response message, the message comprising a description of the capabilities of the terminal in accordance with the SDP standard, and whose declared codecs all arise from the third determined set. According to another particular realization according to which the device is integrated into an application server such as the server 109, the communication module 305 comprises computer program instructions executable by the processor 302 and configured to modify a communication setup message originating from the terminal 100 and destined for the terminal 105, the modification comprising a step of deletion, from the SDP session description included in the message, of the codecs which are not permitted on the communication network, that is to say the deletion of the codecs which do not form part of the third set.

According to a particular realization, the device is integrated into a communication terminal such as a mobile telephone, a smartphone, a tablet, a residential gateway, a connected object or any other communication terminal.

According to a particular realization, the device is integrated into an item of network equipment such as an application server, a CSCF (Call State Control Function) or a PCRF (Policy and Charging Rules Function).

The invention claimed is:

1. A method implemented by an application server of a communication network, the method comprising:
receiving from a server of user profiles of the communication network a notification message relating to restrictions of use of codecs on the communication network, permitted coding formats on the communication network at a moment of notification being included in the notification message as a first set of coding formats permitted on the communication network, each coding format of the first set being associated with a type of access network and with a type of communication service, said notification message being received subsequent to a subscription of said application server for being notified of restrictions of use of codecs on the communication network;
obtaining, in a received message originating from a first terminal registering or being registered to the communication network by way of an access network, a second set of coding formats supported by a first terminal, a type of access network, and a type of communication service which are used by the first terminal;
determining a third set of coding formats, the third set comprising the coding formats of the first set corresponding to coding formats of the second set and associated with the type of access network and the type of communication service used by the first terminal;
in response to the third set of coding formats being empty, unregistering the first terminal; and
in response to the third set of coding formats being not empty, using solely coding formats of the third set for negotiating establishment of communications of the first terminal via the communication network by way of the access network.

2. The method of claim 1 wherein said notification message is received at the moment of the subscription and of the later modifications of the coding formats permitted on the network.

3. The method of claim 1 wherein said application server is notified of restrictions of use of codecs on the communication network at regular intervals.

4. The method of claim 1 wherein the application server receives the first set of coding formats by way of Diameter protocol.

5. The method of claim 1 wherein the application server obtains the second set of coding formats by intercepting a signaling message originating from the first terminal, the signaling message being intended to establish a communication between the first terminal and a second terminal.

6. The method of claim 5 wherein said signaling message is a signaling message according to SDP SDP (Session Description Protocol) standard.

7. The method of claim 1, wherein unregistering the first terminal comprises refusing a renewal of the registration of the terminal.

8. An application server of a communication network, the application server comprising at least one processor and at least one memory, the at least one processor configured to:
receive from a server of user profiles of the communication network a notification message relating to restrictions of use of codecs on the communication network, permitted coding formats on the communication network at a moment of notification being included in the notification message as a first set of coding formats permitted on the communication network, each coding format of the first set being associated with a type of access network and with a type of communication service, said notification message being received subsequent to a subscription of said application server for being notified of restrictions of use of codecs on the communication network;
obtain, in a received message originating from a first terminal registering or being registered to the communication network by way of an access network, a second set of coding formats supported by a first terminal, a type of access network, and a type of communication service which are used by the first terminal;

determine a third set of coding formats, the third set comprising the coding formats of the first set corresponding to coding formats of the second set and associated with the type of access network and the type of communication service used by the first terminal;

in response to the third set of coding formats being empty, unregister the first terminal; and in response to the third set of coding formats being not empty, use solely coding formats of the third set for negotiating establishment of communications of the first terminal via the communication network by way of the access network.

9. The application server of claim 8 wherein said notification message is received at the moment of the subscription and of the later modifications of the coding formats permitted on the network.

10. The application server of claim 8 wherein said application server is notified of restrictions of use of codecs on the communication network at regular intervals.

11. The application server of claim 8 wherein the application server receives the first set of coding formats by way of Diameter protocol.

12. The application server of claim 8 wherein the application server obtains the second set of coding formats by intercepting a signaling message originating from the first terminal, the signaling message being intended to establish a communication between the first terminal and a second terminal.

13. The application server of claim 12 wherein said signaling message is a signaling message according to SDP (Session Description Protocol) standard.

14. The application server of claim 8, wherein unregistering the first terminal comprises refusing a renewal of the registration of the terminal.

15. The application server of claim 12, wherein unregistering the first terminal comprises refusing a renewal of the registration of the terminal.

16. A non-transitory computer readable medium having stored thereon instructions which, when executed by a processor of an application server of a communication network, cause the processor to:

receive from a server of user profiles of the communication network a notification message relating to restrictions of use of codecs on the communication network, permitted coding formats on the communication network at a moment of notification being included in the notification message as a first set of coding formats permitted on the communication network, each coding format of the first set being associated with a type of access network and with a type of communication service, said notification message being received subsequent to a subscription of said application server for being notified of restrictions of use of codecs on the communication network;

obtain, in a received message originating from a first terminal registering or being registered to the communication network by way of an access network, a second set of coding formats supported by a first terminal, a type of access network, and a type of communication service which are used by the first terminal;

determine a third set of coding formats, the third set comprising the coding formats of the first set corresponding to coding formats of the second set and associated with the type of access network and the type of communication service used by the first terminal;

in response to the third set of coding formats being empty, unregister the first terminal; and in response to the third set of coding formats being not empty, use solely coding formats of the third set for negotiating establishment of communications of the first terminal via the communication network by way of the access network.

17. The non-transitory computer readable medium of claim 16 wherein said notification message is received at the moment of the subscription and of the later modifications of the coding formats permitted on the network.

18. The non-transitory computer readable medium of claim 16 wherein said application server is notified of restrictions of use of codecs on the communication network at regular intervals.

19. The non-transitory computer readable medium of claim 16 wherein the application server obtains the second set of coding formats by intercepting a signaling message originating from the first terminal, the signaling message being intended to establish a communication between the first terminal and a second terminal.

20. The non-transitory computer readable medium of claim 19 wherein said signaling message is a signaling message according to SDP (Session Description Protocol) standard.

\* \* \* \* \*